(12) United States Patent
Fan et al.

(10) Patent No.: US 8,045,527 B2
(45) Date of Patent: Oct. 25, 2011

(54) LOAD ESTIMATION FOR A CELL IN A WIRELESS NETWORK

(75) Inventors: Rui Fan, Beijing (CN); Marten Ericson, Lulea (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 12/522,629

(22) PCT Filed: Jan. 18, 2007

(86) PCT No.: PCT/SE2007/050029
§ 371 (c)(1),
(2), (4) Date: Jan. 11, 2010

(87) PCT Pub. No.: WO2008/088257
PCT Pub. Date: Jul. 24, 2008

(65) Prior Publication Data
US 2010/0135170 A1    Jun. 3, 2010

(51) Int. Cl.
*H04Q 7/00* (2006.01)
(52) U.S. Cl. .................. 370/332; 370/349
(58) Field of Classification Search .......... 370/310, 370/310.2, 328, 329, 332, 338, 341, 349
See application file for complete search history.

(56) References Cited

U.S. PATENT DOCUMENTS

| | | | |
|---|---|---|---|
| 6,640,248 B1 | 10/2003 | Jorgensen | |
| 6,747,968 B1 | 6/2004 | Seppala et al. | |
| 6,807,431 B2 | 10/2004 | Sayers et al. | |
| 6,850,732 B2 | 2/2005 | Patterson et al. | |
| 6,862,622 B2 | 3/2005 | Jorgensen | |
| 6,882,637 B1 | 4/2005 | Le et al. | |
| 6,898,194 B1 | 5/2005 | Vedrine | |
| 6,904,110 B2 | 6/2005 | Trans et al. | |
| 6,917,598 B1 | 7/2005 | Emeott et al. | |
| 6,934,756 B2 | 8/2005 | Maes | |
| 6,970,438 B2 | 11/2005 | Mate et al. | |
| 6,987,741 B2 | 1/2006 | Kelly et al. | |
| 7,031,742 B2 | 4/2006 | Chen et al. | |
| 2004/0004949 A1 | 1/2004 | Cayla et al. | |
| 2007/0155395 A1* | 7/2007 | Gopalakrishnan et al. | ... 455/453 |

(Continued)

FOREIGN PATENT DOCUMENTS

EP    1 282 324    2/2003

OTHER PUBLICATIONS

International Search Report for PCT/SE2007/050029, mailed Nov. 28, 2007.

(Continued)

*Primary Examiner* — Brenda Pham
(74) *Attorney, Agent, or Firm* — Nixon & Vanderhye P.C.

(57) ABSTRACT

The invention is directed towards a method of estimating the load on a cell in a wireless network as well as to a cell load estimating device. According to the invention a 5 determination (46) is made of a value (R) indicative of the degree of use, by a mobile station provided in a set of mobile stations connected to a cell, of a communication link provided for this mobile station during a communication session. Based on this value an adjusted link quality value (L-ADJUST) is provided (54) for the mobile station, which is then used when determining the cell load.

15 Claims, 3 Drawing Sheets

U.S. PATENT DOCUMENTS

2009/0097454 A1* 4/2009 Yeou et al. .................... 370/332
2010/0315947 A1* 12/2010 Wigren ......................... 370/230

OTHER PUBLICATIONS

Tidestav, C. et al., "Performance evaluation of activity-based uplink load estimates in WCDMA", Global Telecommunications Conference, 2004. GLOBECOM '04., IEEE vol. 6, (Nov. 29-Dec. 3, 2004), pp. 3845-3849.

Dongxu, Shen et al., "Capability based admission control for broadband CDMA networks", Vehicular Technology Conference, VTC 2001 Fall, IEEE VTS 54$^{th}$, vol. 1, (2001), pp. 202-206.

International Preliminary Report on Patentability, mailed Jul. 21, 2009 in corresponding PCT Application PCT/SE2007/050029.

* cited by examiner

LOAD ESTIMATION FOR A CELL IN A WIRELESS NETWORK

This application is the U.S. national phase of International Application No. PCT/SE2007/050029 filed 18 Jan. 2007, which designated the U.S., the entire contents of which are hereby incorporated by reference.

TECHNICAL FIELD OF THE INVENTION

The present invention relates to the field of load estimation in wireless networks. The invention more particularly relates to a method of estimating the load on a cell in a wireless network as well as to a cell load estimating device.

DESCRIPTION OF RELATED ART

In a typical cellular radio system, mobile stations communicate via a radio access network (RAN) to one or more core networks. The mobile stations can be such stations as mobile telephones ("cellular" telephones) and laptops with mobile termination, and thus can be, for example, portable, pocket, hand-held, computer-included, or car-mounted mobile devices which communicate voice and/or data with radio access networks.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the mobile stations within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM). UTRAN is essentially a radio access network providing wideband code division multiple access (WCDMA) to mobile stations. The Third Generation Partnership Project (3GPP) has undertaken to evolve further the UTRAN and GSM-based radio access network technologies.

In a WCDMA system it is important to estimate the load on the cells, because then it is easier to allocate the available resources to different mobile stations. A good cell load estimating function allows the resources to be used efficiently without having to limit them for different mobile stations.

With the introduction of the enhanced uplink (EUL) in WCDMA, a fast scheduling mechanism in a node or a cell is introduced to manage the uplink cell load quickly. The principle of the fast scheduling is to allow the cell to adjust the maximum data rate with which a terminal is allowed to transmit and to reallocate the resources among users according to the momentary uplink traffic demands and uplink interference variations. Hence, the system can be operated close to the maximum load; leading to an improvement of both data rates for users as well as uplink capacity. To support the fast scheduling, an uplink load estimator is often used to estimate the cell load. The cell load is estimated in terms of the rise over thermal noise (RoT) in the cell. The task of the load estimator is to provide the scheduler with the maximum allowed load and the scheduling headroom. Scheduling headroom determines the highest possible grant, i.e. how high the maximum allowable bit rate, also denoted 'Rmax' could be for each user.

The scheduler estimates a new absolute grant for each user/service based on the total estimated load in the cell, and makes a new scheduling decision among the scheduling requested users. As long as the total load is below a load threshold, all users will retain the wanted maximum bit rate, Ruser. Note that Ruser can never be higher than Rmax. When the total load is above this load threshold, the bit rate must be decreased for certain users. Which users to decrease the bit rate first may for example be selected based on service priority.

The estimation of the RoT can be done in several ways. One method is to directly try to measure the actual received energy in the cell. However, this method is sensitive to measurement errors. Also, it is necessary to know what of this received energy derives from the natural background noise (thermal noise from the electrical equipment). This may be different from cell to cell due to temperature differences etc. Consequently, this method to estimate RoT is prone to errors, both on a short term and biased long term errors.

Therefore it is also common to try to estimate the load. This can for example be done with the knowledge of the Carrier to interference (CIR) target of each service. The CIR target is an indication of how much energy this service will utilize, and thus how much interference it will create.

It is expected that EUL will eventually replace ordinary so-called R99 uplink solutions, at least in hot spots. Such examples might be that VoIP (Voice over IP) replaces CS (Circuit-Switched) speech and that services requiring higher bit rates are/will be deployed on E-DCH instead of R99 DCHs. However, to make this scenario happen, the capacity and coverage for e.g. a VoIP solution must be equally efficient as CS speech.

The transmission of data over the air is in EUL performed by using several different physical channels, for example DPCCH (Dedicated Physical Control Channel), DPDCH (Dedicated Physical Data Channel) E-DPCCH (E-DCH Dedicated Physical Control Channel) and E-DPDCH (E-DCH Dedicated Physical Data Channel), where E-DCH means Enhanced Dedicated Transport Channel.

The power consumptions of these are related to each other by power offsets, i.e. β-values. The power offset in turn, is decided by the so called EUL transport format combination, E-TFC. The E-TFC decides among other things the size of each packet to be sent each transmit time interval (TTI), i.e. it decides the actual possible bit rate for a user.

A known load estimator for E-DCH estimates the cell load based on measurements and provides the scheduler with the scheduling headroom. The total cell load consists of the load caused by the users, as well as other loads such as the load contributions from the surrounding cells and the external interference. Thus the total load is approximately equal to the load of the cell together with the load of the surrounding cells. The E-DCH load is estimated by the sum of CIR of all received signals from the E-DCH users in the cell, where the load for one mobile station is estimated by the measured DPCCH CIR target, here also denoted $\gamma_{DPCCH}$, together with a power offset β determined by the E-TFC, according to $(1+\beta)\gamma_{DPCCH}$. Hence, since the scheduled grant for each mobile station decides the total CIR, the currently scheduled grants for all mobile stations in a cell are used for estimating the load in the cell.

However there exist problems with this known load estimation method, where one major problem is that it would overestimate the load on some links, like for instance links using VoIP. This is due to the following factors. Although, the scheduler helps to control the uplink traffic load to effectively utilize shared resources, it takes some time for the cell to allocate resources to a mobile station. Therefore, generally, the granted E-TFC allocated by scheduler to each mobile station is only available within a certain granted time interval, called effective E-TFC duration, so that the delay involved in scheduling mode could be reduced. When the effective TFC duration expires, the mobile station has to request a new grant. Thus, with a short effective TFC duration, the mobile station has to request a new grant when a new packet shall be transmitted very often. This adds an extra delay for the packet transmission since it takes some time to request and receive a grant. Further on, this means that a mobile station occupies a grant during the assigned time period, i.e. the effective TFC duration, even if there is no data to send. This is not a problem for continuous large amount of traffic, like FTP, as this type of traffic always has data to transmit during this granted time interval. However, for intermittent small amount of traffic, like VoIP, this brings issues for a load estimation which is based on the current scheduled grants for all mobile stations in a cell.

For low bit rate intermittent service, such as VoIP or presence, the mobile stations utilize the granted time interval only in part. However, the load estimator still uses the granted time interval in its estimations, which leads to an overestimation of the load. The consequence of overestimation is a lower system utilization rate, and then both the user data rate and the system capacity are degraded.

There is therefore a need for improved load estimation.

SUMMARY OF THE INVENTION

The present invention is therefore directed towards providing improved load estimation for a cell in a wireless network.

This is generally solved through determining a value indicative of the degree of use, by a mobile station provided in a set of mobile stations connected to a cell, of a communication link provided for this mobile station during a communication session. Based on this value an adjusted link quality value is provided for the mobile station, which is then used when determining the cell load.

One object of the present invention is thus to provide an improved method of estimating the load on a cell in a wireless network.

This object is according to a first aspect of the present invention achieved through a method of estimating the load on a cell in a wireless network, to which cell a number of mobile stations are connected, comprising the steps of: obtaining measurement data of the radio conditions of the links between said mobile stations and said cell, determining link quality values based on the obtained measurement data, and summing the link quality values related to the mobile stations of the cell in order to estimate the total load. For each mobile station in a set of mobile stations connected to the cell a number of further steps are performed. These further steps are the steps of determining a value indicative of the degree of use, by the mobile station, of a communication link provided for the mobile station during a communication session, and providing an adjusted link quality value for the mobile station that considers this value indicative of degree of use of said link.

Another object of the present invention is to provide an improved cell load estimating device.

This object is according to a second aspect of the present invention achieved through a cell load estimating device for a cell in a wireless network, to which cell a number of mobile stations are connected. The device comprises a data obtaining unit that obtains measurement data of the radio conditions of the uplinks between the mobile stations and said cell, and a cell load estimating unit. Here the cell load estimating unit determines link quality values based on the obtained measurement data and sums the link quality values related to the mobile stations of the cell in order to estimate the total load. For each mobile station that is included in a set of mobile stations connected to said cell it also determines a value indicative of the degree of use, by the mobile station, of a communication link provided for the mobile station during a communication session, and provides an adjusted link quality value for the mobile station that considers this value indicative of degree of use of said link.

The present invention has many advantages. With the adjusting of link quality values for a mobile station engaged in a certain type of session, the load contribution of the mobile station is adjusted according to the degree of use by the mobile station of the allocated resources. This degree can be fairly low, especially when there is low bit rate intermittent traffic. By adjusting the estimation of the load contribution a better total load estimation is obtained, which will also lead to a more efficient use of the system resources. This avoids unnecessary system restrictions on the services requested by mobile stations. The invention thus allows a high system utilization rate and may improve both user data rates and uplink capacity.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

The present invention is directed towards estimating the load of a cell provides different types of services.

The basic idea of this scheme is to adjust a known load estimation function to consider the case when a mobile station does not fully use the resources that have been assigned to it. This case occurs when the traffic generated by the service provided for the mobile station is intermittent and limited, thus the mobile station only uses the granted resources in part of a granted time interval. The load estimating device should not only consider the granted resources as before, but also the actual duration that a mobile station uses these resources.

Figure 1:
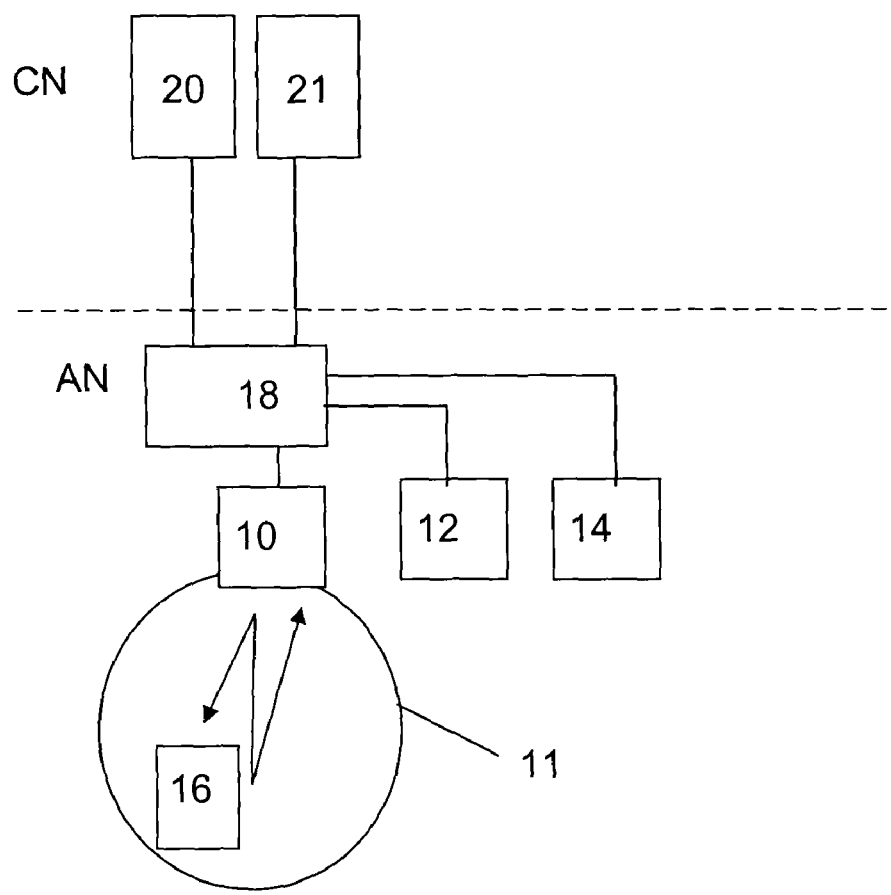
FIG. 1 schematically shows an access network connected to a core network as well as a mobile station connected to a cell handled by a cell handling device of the access network.

The present invention will now be described in more detail in the non-limiting example context of a Universal Mobile Telecommunications (UMTS) network shown in FIG. 1. A core network CN has a first connection-oriented service node 20, which may be a Mobile Switching Centre (MSC) that provides circuit-switched services. The core network CN also includes a second General Packet Radio Service (GPRS) node 21 tailored to provide packet-switched type services, which is sometimes referred to as the serving GPRS service node (SGSN). The service node 20 may be connected to circuit switched networks such as PSTN (Public Switched Telephone Network) or GSM (Global System for Mobile communication). The node 21 may be connected to connectionless-oriented networks such as the Internet.

Each of the core network service nodes 20 and 21 connects to an access network AN, which is here a UMTS Terrestrial Radio Access Network (UTRAN). UTRAN AN includes one or more radio network controllers (RNC), where only one RNC 18 is shown in FIG. 1. The RNC 18 is connected to a plurality of cells. The RNC 18 is connected to a first cell handling device 10, a second cell handling device 12, and a third cell handling device 14. Each of these cell handling devices 10, 12 and 14 control communication within a cell. Here it should be realised that one cell handling device may handle more than one cell. In the figure only one cell 11 associated with the first cell handling device 10 is shown. The cells are provided in a geographical area covered by the access network AN. The cell handling devices are within these types of networks base stations. In FIG. 1 a mobile station 16 is shown in the cell 11 handled by the base station 10 in the access network AN and shown as communicating with this base station 10. It should be realised that normally there may be provided several mobile stations communicating with a base station.

Figure 2:
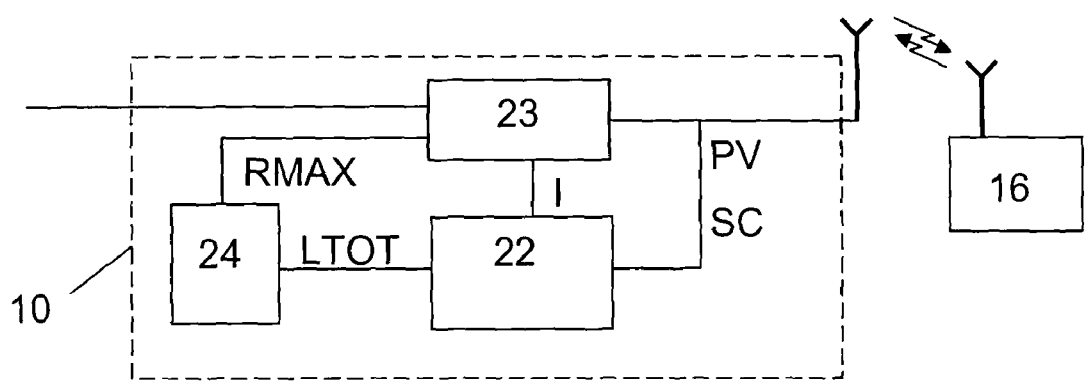
FIG. 2 shows a block schematic of the cell handling device being connected to the mobile station and comprising a cell load estimating device according to the present invention being connected to a scheduler and to a control unit.

FIG. 2 shows a block schematic of a base station 10 comprising a load estimating device 22 according to the present invention being connected to a scheduler 24. The base station 10 includes one or more antennas for communicating with the mobile station 16. However, in the figure there is only shown one such antenna. This antenna is connected to a control unit 23, which in turn is connected to the RNC (not shown). The control unit 23 is furthermore connected to the load estimating device 22, which in turn is connected to the scheduler 24. The scheduler is finally also connected to the control unit 23.

The load estimating device 22 obtains input data in the form of measurement data relating to the radio conditions of the uplinks between the mobile station 16 and the cell. This data includes power values PV transmitted from the mobile stations as well as interference measurements I determined by the base station 10 and provided to the cell load determining device 22 from the control unit 23. The load estimating device 22 also obtains system control signals SC sent to the mobile station. All this data is then used in order to determine the load of the cell according to the principles of the present invention.

Figure 3:
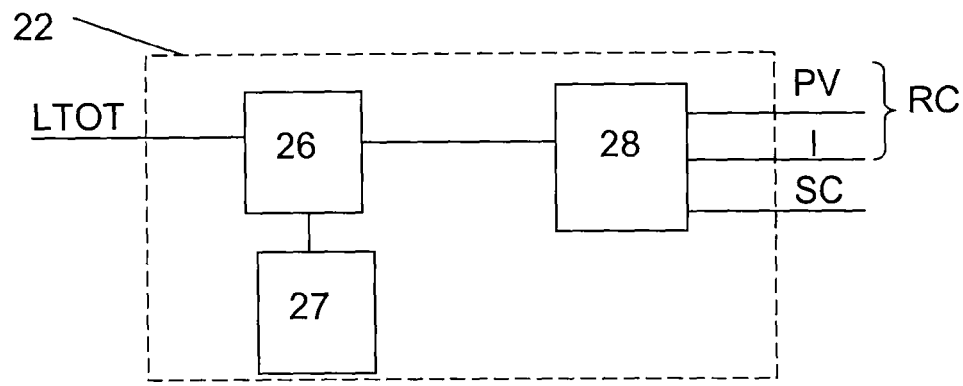
FIG. 3 shows a block schematic of the cell load handling device according to the present invention.
Figure 4:
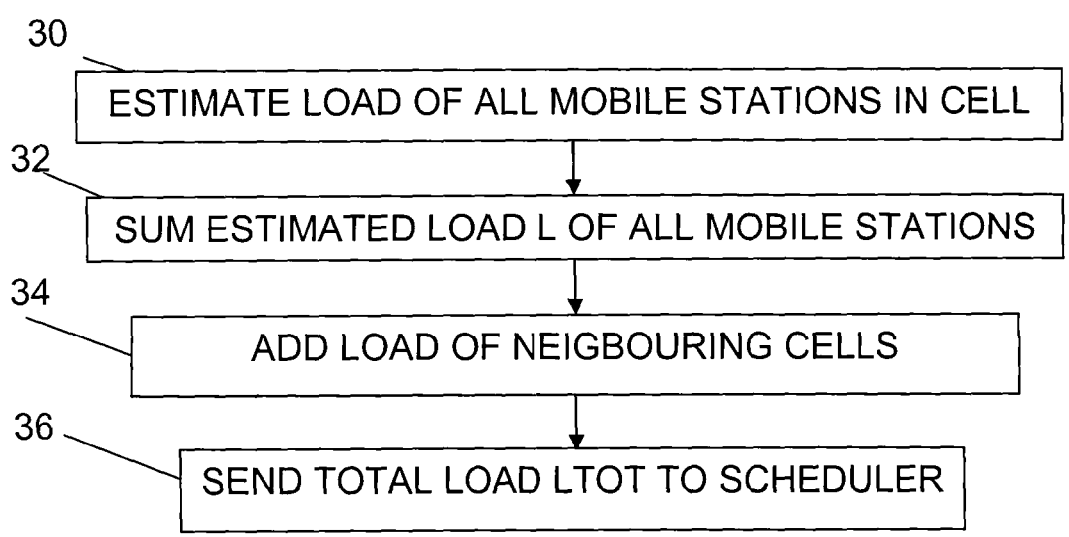
FIG. 4 shows a flow chart of a number of general method steps taken when determining the load of a cell.

FIG. 3 shows a block schematic of the general structure of the cell load estimating device 22 according to the present invention. It includes a data obtaining unit 28 receiving measurement data RC of the radio conditions of the uplinks between the mobile stations and the cell, which radio condition data includes power values PV provided by the mobile stations as well as interference measurements I provided by other units in the base station. As an alternative, it is possible that the load estimating device includes an interference measuring unit. It is also possible that the mobile stations supply interference measurements. The data obtaining unit 28 also monitors system control signals SC sent to the mobile station 16. There is also a cell load determining unit 26, which receives the different types of data RC and SC and determines a total load on the cell LTOT, which is to be used by the scheduler when allocating resources to the different mobile stations in the cell. The cell load determining unit 26 is furthermore connected to a load value store 27.

Now will follow a first general description of the operation of the cell load estimating device according to the present invention, with reference being made to FIGS. 1, 2, 3, and 4, where the latter shows a flow chart of a number of general method steps taken when determining the load of the cell. The invention will here be described in relation to EUL (Enhanced Uplink) in UMTS networks and especially for different kind of services granted to mobile stations, where the mobile stations are granted E-TFCs (E-DCH Transport Format Combination). E-TFC in essence provides a measure of a selection by a mobile station of the amount of data that is to be transmitted within a certain granted transmission time interval (TTI) with the transmit power that is available. E-DCH here means Enhanced Dedicated Transport Channel.

The load estimating unit 26 of the load estimating device 22 generally determines the load contribution of each mobile station 16 in the cell 11 through estimating the load of all these mobile stations, step 30. The load contribution is normally determined through calculating a link quality value that is normally a ratio between a signal power level and interference or noise. How this is done will be described in more detail below. It thereafter sums the load estimations L, step 32, and then adds the load contributions from the neighbouring cells to this sum, step 34. This neighbour cell load contribution may be omitted and may also with advantage be a constant that has been determined based on previous experience of the network load. In this way the cell load estimating device 22 provides a value of the load LTOT experienced by the cell 11, which it forwards to the scheduler 24, step 36, in order for the scheduler to determine a value maximum bit rate RMAX to be applied for the different mobile stations 16 when locating network resources.

A mobile station operating according to E-DCH, normally transmits power values to the network that it used in relation to a first channel DPCCH (Dedicated Physical Control Channel). However when it transmits data it is assigned a second data transmission channel, which may be an E-DCH channel. The power levels used by the mobile station on this second channel are here offset from the power levels of the DPCCH channel with an offset 13. This offset is set according to the E-TFC that the mobile station is using, i.e. based on the amount of data that is to be transmitted in a granted time interval and normally obtained through making a table look-up. For mobile stations that are engaged in communication sessions their link qualities or load contributions are then determined based on the power used on the second data transmission channel in relation to interference and for mobile stations that are idle, their contribution is based on the power used on the first channel. However, when determining the load contribution of a mobile station the estimation may provide a result that is too high, because a mobile station does not fully use the resources it has been allocated.

The link between a mobile station and the base station is thus made up of the first and second channels, but may also include other channels.

Figure 5:
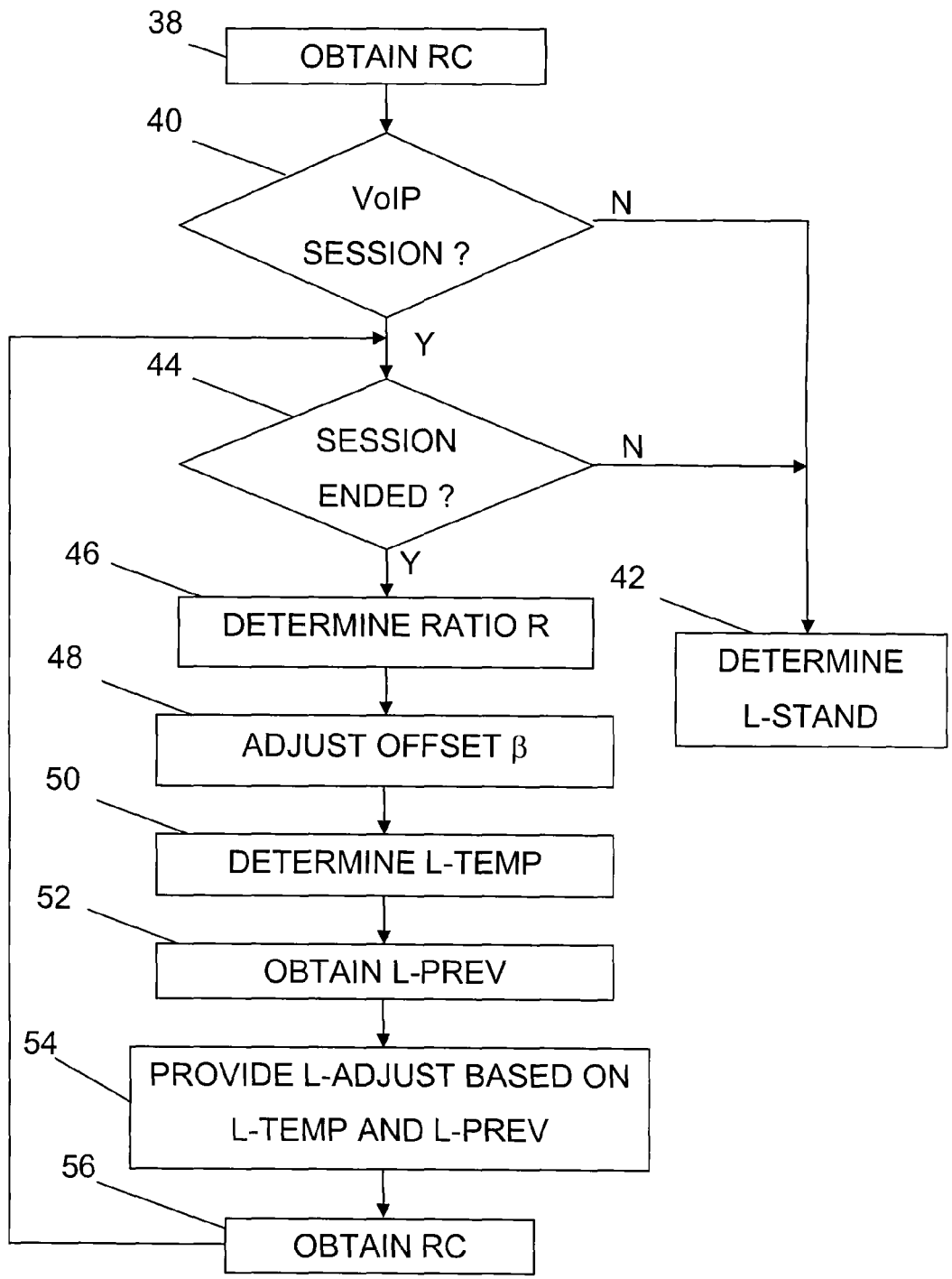
FIG. 5 shows a flow chart of a number of method steps performed according to the method of the present invention for determining the load contribution of a mobile station.

The present invention is directed towards improving this situation. Reference is therefore now also made to FIG. 5, which shows a number of further method steps taken according to the present invention in order to provide a better cell load estimation. The method steps shown in FIG. 5 are continuously performed for each mobile station 16 located in the cell 11. For each mobile station 16 the radio condition measurement obtaining unit 28 of the cell load estimating device 22 first obtains radio condition measurement data RC, step 38. This data normally includes cell interference measurements I, which are typically uplink interference measurements for the mobile station 16 as well as other radio condition measurements like transmission power measurements, i.e. measurements relating to transmission power used by a mobile station 16. This may be in the form of code power measurement data in the form of a power value PV that is obtained either from the mobile station 16 or the control unit 23 of the base station 10. As an alternative to code power it is also possible to obtain other types of transmission power data, for instance measurements of the power headroom, i.e. the remaining power left to use in the mobile station 16.

This data is forwarded to the cell load estimating unit 26, which then determines if the mobile station 16 belongs to a certain set of mobile stations, which set here are the mobile stations that use a certain type of service. In the embodiment described here, the service is a VoIP service. The determination may be based on determining the type of bearer used for the communication. If there is a certain system signal, which is a service indicator signal sent to or from the mobile station, it may as an alternative also be possible to detect such an indicator.

If the mobile station 16 is not in the set, i.e. is not engaged in a VoIP session, step 40, the cell load estimating unit 26 determines the load or link quality value of the mobile station 16 in a standard way, as a normal load L-STAND, step 42. If for instance the mobile station 16 is not involved in a session, i.e. is idle and not using a second data transmission channel, this load is determined according to:

$$\text{L-STAND1} = \gamma_{DPCCH} \quad (1)$$

where $\gamma_{DPCCH}$ is the carrier-to-interference ratio (CIR) for the DPCCH channel of the mobile station, determined through the received power values PV and the determined interference I according to PV/I.

However, if the mobile station is not engaged in a VoIP session, but in another type of session, like for instance engaged in uploading of files (FTP) via a second data transmission channel, then the normal load or link quality L-STAND is determined according to:

$$\text{L-STAND2} = (1+\beta)^* \gamma_{DPCCH} \quad (2)$$

where $\gamma_{DPCCH}$ is the carrier-to-interference ratio (CIR) related to the DPCCH channel as in equation (1) above and $\beta$ is the offset of the E-DCH channel from the first channel DPCCH.

If however, the mobile station is involved in a VoIP session, step 40, then the cell load estimating unit 26 continues and investigates if the session is ended. If the session is not ended, step 44, it goes on and determines a ratio R indicative of the degree of use of the second data transmission channel, step 46.

How this is done will now be described in somewhat more detail. A mobile station 16 which is involved in a session requests to be allowed to send data packets and is then assigned or granted E-TFC for a time duration, called the effective TFC duration. During this time duration the mobile station is allowed to transmit data. This is assigned through the system sending a session indication system signal. However, because it takes time to get a new grant for the mobile station 16, and to require a new grant for every packet transmission will incur a quite a long delay for each packet, this time duration cannot be too short. However, services like VoIP, will not use the granted E-TFC all the time during the granted time interval. Thus, for intermittent small amount of traffic, like VoIP, this brings issues for a load estimation which is based on all mobile stations current scheduled grants in a cell.

Furthermore, each time a packet is sent to a base station, the base station acknowledges safe receipt with a system signal in the form of an acknowledgement signal ACK, and sends another system signal NACK if the packet is not received properly. A packet that is not received properly will be retransmitted. This means that the signals ACK and NACK together with the number of transmission time intervals provide information that can be used for a better estimation of the load for services like VoIP services.

Therefore after the determination of a VoIP session, step 40, and determining that the session is not ended, step 44, the load estimation unit 26 of the load estimating device 22 receives NACK and ACK signals from the data obtaining unit 28 and keeps a counter for these, where each counter is incremented when the corresponding signal is received. It also keeps a counter for the transmission time interval. It then determines a value indicative of the degree of use of the communication link, which is here the degree of use of the second data transmission channel in the form of a ratio R, step 46, which is determined according to:

$$R = \frac{SUM(ACK + NACK)}{SUM(ACK)} \cdot \frac{SUM(ACK)}{SUM(TTI)} \quad (3)$$

where SUM(TTI) is the aggregated number of transmission time intervals since the session started. Here the first part of the ratio is a term that considers all transmissions, successful and unsuccessful, while the second only considers the successful transmissions. Thus the second term determines the ratio based on transmitted packets and the first term considers the number of retransmitted packets. It should here be realized that the first term SUM (ACK+NACK)/SUM(ACK) may be omitted from the ratio in case a simplified load estimation is desired that only considers successful transmissions. It is of course also possible to simplify the expression (3) above through omitting SUM(ACK).

Thereafter the load estimating unit 26 adjusts the above mentioned offset $\beta$ that is used for the channel in question, step 48, through multiplying the offset $\beta$ with the ratio R. It thereafter determines a current temporary load value L-TEMP, step 50, which is determined through applying the adjusted offset $\beta$ in equation (2) above.

When this has been done the load estimating unit 24 retrieves a previously determined adjusted load value L-PREV from the adjusted load value store 27, step 52, and uses this to provide an adjusted load value L-ADJUST, step 54. The adjusted load value or adjusted link quality value L-ADJUST is based on the previously determined load value L-PREV and the temporary load value L-TEMP. This can be done according to $$L\text{-}ADJUST = \alpha * L\text{-}PREV + (1-\alpha) * L\text{-}TEMP \qquad (4)$$

where $\alpha$ is a weighting factor between 0 and 1. The weighting factor may here be set differently depending on the desired impact of the above mentioned ratio R on the adjusted load value L-ADJUST.

The first time this is done L-PREV is set to be equal to L-STAND2 in equation (2) above.

The adjusted load value L-ADJUST is then used as the load contribution of the mobile station 16 in the estimation of the total load on the cell as well as stored in store 27 in order to be used as the previously adjusted load value L-PREV for a following provision of an adjusted load value L-ADJUST. When this has been done, radio condition measurement data RC is again obtained, step 56, and the method once again and returns to check if the session is ended or not, step 44. The method then continues in the above described way until the session is ended.

After a session is ended and the grant is released, the load of the mobile station is determined based on equation (1), the ACK and NACK counts and the SUM(TTI), the aggregated number of transmission time intervals since the session started, re-set to zero and L-PREV set to L-STAND2.

With the above described way of adjusting the load value of a mobile station engaged in a certain type of session, the load contribution of the mobile station 16 is adjusted according to the degree of use by the mobile station of the allocated resources. This degree can be fairly low, especially when there is low bit rate intermittent traffic. Since the load is better estimated, the so called effective grant duration may be set much longer than previously, and this avoids unnecessary time consuming resource requests (grant requests) by the mobile station each time it has data to send. By adjusting the estimation of the load contribution a better total load estimation is obtained, which will also lead to a more efficient use of the system resources. This avoids unnecessary system restrictions on the services requested by mobile stations. The invention thus allows a high system utilization rate and may improve both user data rates and uplink capacity. The invention also uses previous values in order not to provide too abrupt changes from the start. Over time however the load is averaged to better reflect the correct use of resources by mobile stations.

The way in which a determination is made of when a session is ended or not can with advantage be performed in the following way. The load estimating unit 26 may also keep watch on the granted E-TFC mentioned above. This signal may, apart from granting data packets to be sent, also deny data packets to be sent. The load estimating unit 26 may then, in parallel with providing the adjusted load value, also determine an unadjusted load value. As long as the granted E-TFC indicates that a session is ongoing this unadjusted link quality value is set according to equation (2), while as soon as the granted E-TFC indicates that the session is ended, the unadjusted load value is set according to equation (1). The load estimating unit 26 then compares the adjusted load value with this unadjusted load value and as soon as the unadjusted load value is lower than the adjusted load value, the determination of a ratio and the provision of an adjusted load value are stopped and the unadjusted load value is instead set as the load contribution of the mobile station 16. This feature provides a faster provision of a correct load contribution from a mobile station when the session is ended.

There are a number of variations of the present invention that are possible. The temporary load value may be used directly as an adjusted load value, without any weighting being performed using previous load values. Also the way that a session is ended may be determined in other ways. One way may be through experience, for instance if not having detected ACK and NACK signals for some time. It should here also be realised that the service is not limited to VoIP, but can be applied on other services where the assigned time limit is not used fully. Like for instance chat services. The set may furthermore be so broad as to include all mobile stations connected to the base station.

The cell load estimating device according to the present invention can be implemented through one or more processors together with computer program code for performing the functions of the invention. The program code mentioned above may also be provided as a computer program product, for instance in the form of a data carrier carrying computer program code for performing the method according to the present invention when being loaded into a computer. The cell load estimating device may furthermore be provided as a separate device or as a part of another entity in the network, for instance as a part of the base station.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the present invention is only to be limited by the following claims.

The invention claimed is:

1. A method of estimating the load on a cell in a wireless network, to which cell a number of mobile stations are connected, comprising the steps of:
    obtaining measurement data of the radio conditions of the links between said mobile stations and said cell,
    determining link quality values based on the obtained measurement data, and
    summing the link quality values related to the mobile stations of the cell in order to estimate the total load,
    wherein said method further comprises the steps of, for each mobile station in a set of mobile stations connected to said cell,
    determining a value indicative of the degree of use, by the mobile station, of a communication link provided for the mobile station during a communication session, and providing an adjusted link quality value for the mobile station that considers this value indicative of degree of use of said link.

2. The method according to claim 1, wherein said value indicative of the degree of use is determined based on an estimation of the time occupied for sending data by the mobile station in relation to a granted time interval for such sending of data on the link for the mobile station.

3. The method according to claim 2, wherein the estimation of the time occupied for sending data in relation to the granted time interval is determined through determining the number of data packets transmitted from the mobile station in relation to a number of assigned transmission time intervals within the granted time interval.

4. The method according to claim 3, wherein said estimation of the time occupied for sending data is also determined based on the number of data packets retransmitted by the mobile station.

5. The method according to claim 2, wherein said value indicative of the degree of use is continuously re-determined while the link is being used for sending data in the communication session.

6. The method according to claim 1, wherein the measurement data relating to the mobile station in the set is a transmission power value used by the mobile station in relation to the link between the mobile station and the cell, and said value indicative of the degree of use is being used for adjusting a power value associated with a specific channel on said link between the mobile station and the cell when determining link quality.

7. The method according to claim 6, wherein said transmission power value is provided for a first channel of the link and the value indicative of the degree of use is being used in relation to an adjusted link quality value for a second data transmission channel of the link that is based on a transmission power that is offset from the power indicated by said transmission power value of the first channel.

8. The method according to claim 1, wherein the step of providing an adjusted link quality value comprises adjusting a temporary current link quality value that has been determined based on a current value indicative of the degree of use with previous link quality value.

9. The method according to claim 8, where if the current value indicative of the degree of use is the first such value, the previous link quality value is an unadjusted link quality value and otherwise it is a previous adjusted link quality value.

10. The method according to claim 1, further comprising the steps of determining that the session is no longer ongoing and stopping determining the degree of use and providing adjusted link quality values based on this determination.

11. The method according to claim 10, wherein the step of determining that the session is no longer ongoing comprises comparing the adjusted link quality value with an unadjusted link quality value provided for the link and performing the step of stopping determining the degree of use and providing adjusted link quality values if this unadjusted value is lower than the adjusted value and setting this unadjusted value as the link quality value.

12. Method according to claim 11, further comprising the step of detecting a session indication system signal and setting the unadjusted link quality value used in the comparison to be a link quality value that is a basic link quality value associated with a first channel of the link if the signal indicates no communication session and as a link quality value being offset from the basic link quality value with an offset associated with a second data transmission channel of the link if the signal indicates the existence of a session.

13. Method according to claim 1, further comprising the step of obtaining an indicator for each mobile station of the type of service it is engaged in and selecting if a mobile station is to be provided in the set or not based on said indicator.

14. A cell load estimating device for a cell in a wireless network, to which cell a number of mobile stations are connected comprising:
a data obtaining unit configured to obtain measurement data of the radio conditions of the uplinks between said mobile stations and said cell, and a cell load estimating unit configured to determine link quality values based on the obtained measurement data, sum the link quality values related to the mobile stations of the cell in order to estimate the total load, and for each mobile station in a set of mobile stations connected to said cell, determine a value indicative of the degree of use, by the mobile station, of a communication link provided for the mobile station during a communication session, and provide an adjusted link quality value for the mobile station that considers this value indicative of degree of use of said link.

15. The cell load estimating device according to claim 14, wherein it provided in a cell handling device.

* * * * *

UNITED STATES PATENT AND TRADEMARK OFFICE
CERTIFICATE OF CORRECTION

PATENT NO. : 8,045,527 B2  
APPLICATION NO. : 12/522629  
DATED : October 25, 2011  
INVENTOR(S) : Fan et al.

Page 1 of 1

It is certified that error appears in the above-identified patent and that said Letters Patent is hereby corrected as shown below:

On the Title Page, in Item (75), under "Inventors", in Column 1, Line 1, delete "Marten" and insert -- Mårten --, therefor.

On the Title Page, in Item (75), under "Inventors", in Column 1, Line 2, delete "Lulea" and insert -- Luleå --, therefor.

In Column 6, Line 58, delete "offset 13." and insert -- offset β. --, therefor.

In Column 7, Line 47, delete "$\gamma_{DPCCH}$" and insert -- $\gamma_{DPCCH}$ --, therefor.

In Column 8, Line 27, delete "VoiP" and insert -- VoIP --, therefor.

In Column 11, Line 25, in Claim 9, delete "where" and insert -- wherein --, therefor.

In Column 12, Line 4, In Claim 12, delete "Method" and insert -- The method --, therefor.

In Column 12, Line 13, in Claim 13, delete "Method" and insert -- The method --, therefor.

Signed and Sealed this  
Fifteenth Day of May, 2012

David J. Kappos  
*Director of the United States Patent and Trademark Office*